United States Patent [19]

Röhm

[11] 4,200,300
[45] Apr. 29, 1980

[54] LATHE CHUCK WITH REMOVABLE JAWS

[76] Inventor: Günter H. Röhm, Heinrich-Röhm-Str. 50, 7927 Sontheim, Fed. Rep. of Germany

[21] Appl. No.: 886,348

[22] Filed: Mar. 14, 1978

[30] Foreign Application Priority Data

Mar. 18, 1977 [DE] Fed. Rep. of Germany ....... 2711904

[51] Int. Cl.² .............................................. B23B 31/14
[52] U.S. Cl. .................................... 279/1 C; 279/121
[58] Field of Search ............... 279/1 C, 110, 123, 111, 279/112, 113, 121

[56] References Cited

U.S. PATENT DOCUMENTS

| | | | |
|---|---|---|---|
| 1,253,224 | 1/1918 | Fisher | 279/112 |
| 3,682,491 | 8/1972 | Sakazaki et al. | 279/110 X |
| 4,026,566 | 5/1977 | Röhm | 279/123 X |

FOREIGN PATENT DOCUMENTS

| | | |
|---|---|---|
| 1940609 | 4/1971 | Fed. Rep. of Germany . |
| 2060057 | 9/1971 | Fed. Rep. of Germany . |
| 2052037 | 4/1972 | Fed. Rep. of Germany . |
| 2007509 | 11/1972 | Fed. Rep. of Germany . |
| 2232022 | 1/1974 | Fed. Rep. of Germany . |
| 2347561 | 11/1974 | Fed. Rep. of Germany . |
| 2533803 | 3/1977 | Fed. Rep. of Germany . |

Primary Examiner—Z. R. Bilinsky
Attorney, Agent, or Firm—Karl F. Ross

[57] ABSTRACT

A chuck has a chuck body rotatable about an axis and formed with a plurality of angularly spaced radially extending inner guides and a plurality of angularly spaced and radially extending outer guides. An inner jaw part wholly received within the chuck body is radially displaceable in each of the inner guides and an outer jaw part projecting axially from the chuck body is radially displaceable in each of the outer guides. An operating element is engaged with all of the inner jaw parts to jointly radially displace them. A coupling member is axially displaceable in each of the inner jaw parts between a coupling position in which each of the inner parts is locked for joint radial movement with the respective outer part and an axially offset decoupling position allowing relative radial displacement of the outer jaw parts and the respective inner jaw parts. These coupling members may be independently operable, or jointly operable by means of a cam ring.

15 Claims, 6 Drawing Figures

LATHE CHUCK WITH REMOVABLE JAWS

FIELD OF THE INVENTION

The present invention relates to a chuck. More particularly this invention concerns such a chuck normally mounted on the headstock of a lathe and having a plurality of jaws radially displaceable to hold a workpiece.

BACKGROUND OF THE INVENTION

A chuck for use in the headstock of a lathe normally has a chuck body which is centered on and rotatable about an axis, and a plurality of jaws which are radially displaceable on this chuck body to hold a workpiece being machined in the lathe. Although chucks exist wherein the jaws are independently radially displaceable, normally these jaws are three in number and are jointly radially displaceable so that a workpiece gripped thereby will be centered on the chuck axis.

In one known system as seen for example in German patent publication No. 2,232,022 axially backwardly projecting formations on the backs of the jaws engage in spiral formations on a closing plate carried in the chuck body and rotatable about the axis of the chuck to displace the jaws radially jointly inwardly and outwardly. This ring is normally manually rotated to grip and release the workpiece.

It is also known from German patent publication Nos. 1,940,609, 2,007,509, 2,347,561, and 2,533,803 to radially displace the jaws by means of rods axially or tangentially engaged in the chuck body and in turn engaging the backs of the jaws by means of teeth or wedge formations so that axial or tangential shifting of these rods radially displaces the chuck jaws. Such rods are in turn operated manually or by means of external fluid-operated cylinders or lever assemblies.

In another known arrangement seen in German patent publication No. 2,060,057 a lever pivotal in the chuck body is employed to adjust the jaws, and German patent publication No. 2,052,037 teaches the use of axially displaceable so-called wedge hooks which engage the jaws.

In all such arrangements changing the jaws is a relatively difficult task. Such changing is necessary to use jaws particularly set up to accommodate a particular kind of workpiece, or to replace jaws which are badly worn or which have been damaged during the machining operation. To this end the jaws are typically made of mild steel, whereas the rest of the chuck is made of very hard tool steel.

In the system of German patent publication No. 2,232,022 it is necessary to rotate the so-called spiral ring through many revolutions in order to move the jaws radially outwardly far enough so that they can be removed from the chuck. Such an operation is relatively time consuming, and fitting of the new jaws back into the chuck is a relatively difficult operation as it is essential to ensure that the jaws are properly radially positioned for good centering of a workpiece to be gripped thereby.

The system of German patent publication Nos. 2,347,561 and 2,533,803 requires a relatively long travel of the operating mechanism in order to free the jaws so that they can be removed from the chuck. Thus it is necessary to dimension the assembly so that the actuating member can move far enough back to completely disengage the operating rods from the jaws for their removal. At the same time some mechanism must be provided to prevent accidental displacement of the operating member into this fully withdrawn position, as should it accidentally move into this position during operation of the lathe the jaws will fly outwardly from the chuck and create a considerable hazard.

It has been suggested in the wedge-hook system of German patent publication No. 2,052,037 to make the wedging arrangement limitedly angularly dispalceable so that in one of its angular positions it is completely out of line with the jaws and their removal is relatively easy. Such an arrangement has the advantage of simplicity, that nonetheless requires replacement of the entire relatively expensive jaws. Furthermore such an arrangement has the disadvantage that maladjustment can result in the jaws not being adequately held in the chuck so that they can fly therefrom on rotation of the chuck as described above.

Thus in virtually all of the known systems replacement of the chuck jaws is a relatively difficult and expensive operation. For this reason when changing over from one type of machining operation to another, when the changeover requires replacement of the jaws, considerable downtime must be reckoned with for rebuilding of the lathe chuck.

OBJECTS OF THE INVENTION

It is therefoer an object of the present invention to provide an improved lathe chuck. Another object of this invention is the provision of such a chuck wherein the jaws can be changed in a relatively simple operation.

Another object is to provide a lathe chuck with removable jaws wherein accidental disconnection of the jaws is impossible.

A further object of this invention is the provision of a lathe chuck which, although producible at relatively low cost, can be used with many different types of jaws and which can be operated even by a relatively inexperienced worker.

SUMMARY OF THE INVENTION

These objects are attained according to the present invention in a chuck of the above-described general type, wherein each of the chuck jaws is formed of an outer part adapted to engage a workpiece and an inner part which is engaged with the operating element that radially displaces the jaws. A coupling member is provided between each of the outer parts and the respective inner part and is displaceable between a coupling position wherein it couples the two respective parts together for joint radial displacement and a decoupling position for relative radial displacement of the respective jaw parts.

Thus in accordance with the present invention it is possible to replace the outer parts of the jaws with relative ease, merely by actuating the respective coupling member so as to decouple such outer part from the respective inner part. During exchange of outer jaw parts it is not necessary to reset the inner jaw parts at all, or to in any manner actuate or change the setting of the operating element responsible for radial positioning of the jaws. Furthermore the outer jaw part can be made at relatively low expense of mild steel described above, whereas the inner jaw parts, which are permanently part of the chuck, can be of relatively expensive and finely machined construction, as these inner jaw parts are an integral part of the chuck and not normally replaced. Such an arrangement not only allows the actuating mechanism for the jaws to remain relatively simple, but it also allows chucks to be produced which can fit on various different types of lathes, but which all have the same interchangeable outer jaw parts, so that once again a reduction in production expense for these outer parts is obtained due to the mass production of them. According to further features of this invention each coupling member is axially displaceable between the coupling and decoupling positions in the respective inner jaw part which lies wholly inside the chuck body. Means including a spring is provided for normally urging this coupling member into one of these positions so that only when the coupling member is intentionally actuated can the respective outer jaw part be removed from the chuck.

The coupling members may all be jointly displaceable between the coupling and decoupling positions by a common actuating element formed as a cam ring centered on the axis of the chuck and angularly displaceable between a pair of angularly offset positions corresponding to the coupling and decoupling positions. This ring may be operable by means of a setting pin having an eccentric crank, so that simple pivoting of the setting pin through 90° or 180° frees all of the outer jaw parts for a rapid and simple exchange of these parts. This type of construction furthermore allows the coupling members to be locked positively in the coupling position so as completely to eliminate the possiblity of an accidental separation of the jaw parts from each other and a centrifugal throwing-out of the outer jaw parts. To this end the cam ring which jointly operates all of the coupling members is formed at each of the coupling members with a respective cam surface that has two portions lying in respective planes perpendicular to the axis but offset from each other, and a third portion extending at an angle to these two portions so that it lies in a plane transverse to but nonperpendicular to the axis. When the one of the surfaces perpendicular to the axis bears on the back of the respective coupling member it holds this coupling member positively in the coupling position, and the other surface holds it in the decoupling position. The inclined surface between these surfaces serves for the changeover from the coupling to the decoupling position. In such an arrangement the coupling members are spring-biased into the decoupling position.

It is also possible according to this invention to provide a respective camming member at each of the coupling members. Such a cam according to this invention is displaceable between a radial inner position corresponding to the decoupling position and a radial outer position corresponding to the coupling position so that centrifugal forces in the chuck when it is rotated will naturally hold this cam in the coupling position. Such a cam has axially spaced front and back camming surfaces which coact with corresponding axially spaced actuation surfaces on the respective coupling member for positive displacement of same between the decoupling and coupling positions. The axial outer end of this cam may be formed as a simple button so that the user need merely depress the button at each of the jaws so as easily to pull the respective outer jaw part off.

In accordance with further features of this invention the coupling member is formed on its axially forwardly directed face with a plurality of axially projecting teeth and the respective outer jaw part is formed on its axially backwardly directed face with a similar complementary set of axially backwardly directed teeth that can mesh with the teeth of the respective coupling member to form a rigid radially effective connection between them. In order to facilitate mounting new outer jaw parts on a chuck according to this invention means may be provided for urging an outer jaw part into a position with its teeth meshable with the teeth of the respective coupling member so that when same is displaced into the coupling position its teeth will automatically mesh with those of the outer jaw part.

According to a further feature of this invention the teeth formed on the backwardly directed face of the outer jaw part extend radially the full length thereof. Such construction allows the outer jaw part to assume any of a wide range of positions relative to the inner jaw part so that even in a relatively small chuck or a chuck having a relatively small possibility of radial adjustment, one can vary the spacing between the outer jaw parts greatly. In this manner in order to hold a relatively large workpiece in a relatively small chuck one need only disconnect the outer jaw parts from the inner jaw parts and slip them radially outwardly to some extent, thereby achieving an altogether new range of adjustment of the chuck without in any way increasing the cost, size, or complexity thereof.

Finally, this invention provides on the chuck body a spring-loaded positioning pin that serves for holding the outer jaw part in a position with its teeth aligned with and meshable with the teeth of the respective coupling member. This positioning pin is provided on the inner jaw part and therefore serves to facilitate assembly of the chuck in that the outer jaw part is automatically positioned in such a manner that the teeth of the coupling member can always engage directly into the teeth of the outer jaw part without the operator having to manipulate the outer jaw part. This arrangement is particularly useful in a system wherein the coupling member is locked by its respective actuator in the coupling and decoupling positions.

SPECIFIC DESCRIPTION

Figure 1:
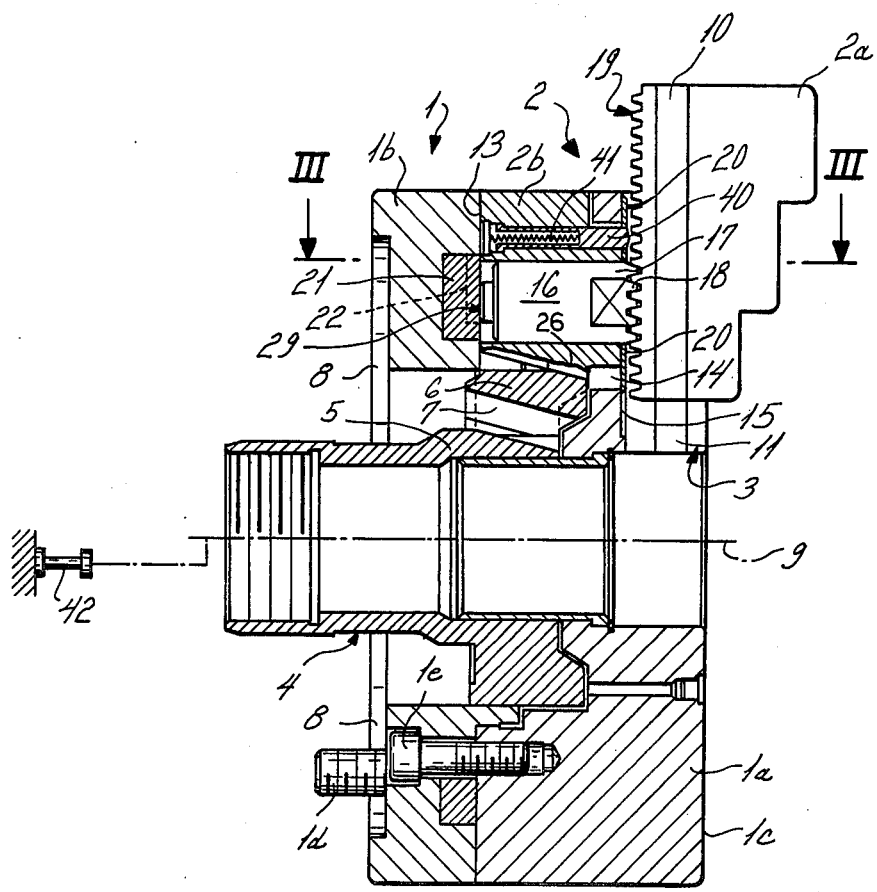
FIG. 1 is an axial section through a chuck according to this invention.
Figure 2:
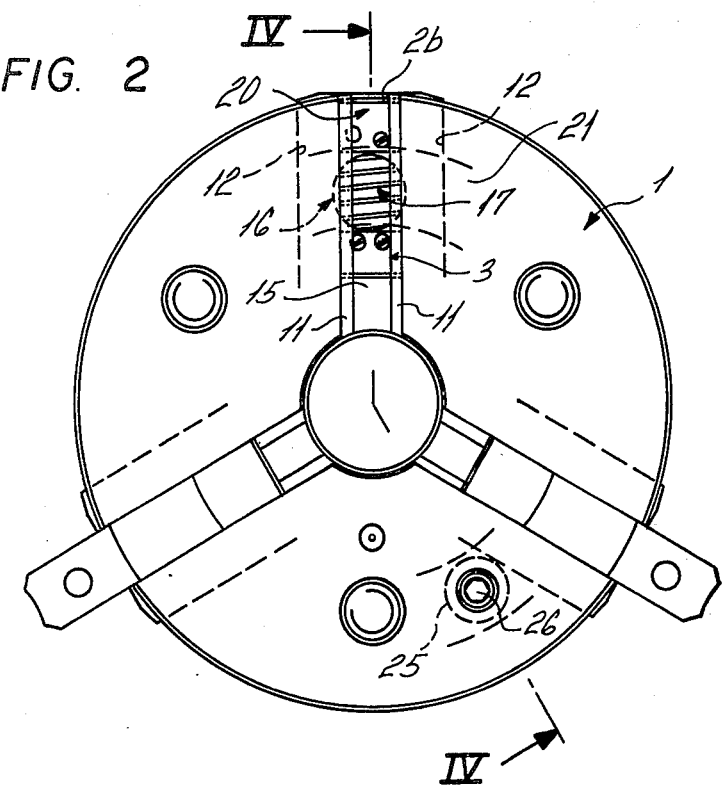
FIG. 2 is an end view of the chuck of FIG. 1.
Figure 3:
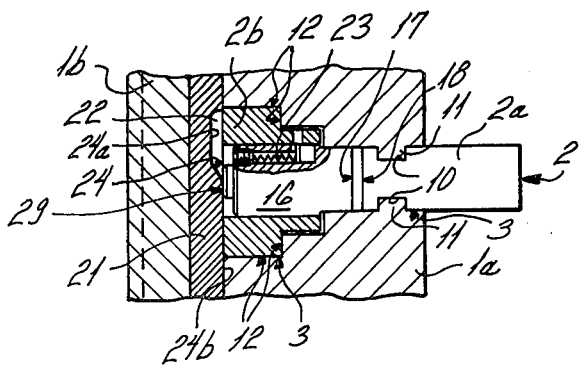
FIGS. 3 and 4 are sections taken along lines III—III and IV—IV of FIGS. 1 and 2, respectively.

As shown in FIGS. 1-3 a chuck according to this invention has a chuck body 1 of generally cylindrical shape and formed by a front cylindrical plate 1a having a front face 1c and a rear plate 1b having rearwardly axially projecting studs 1d and secured by means of machine screws 1e to the front plate 1a. Furthermore this rear plate 1b is formed with a cylindrical recess 8 used with the studs 1d to mount the annular chuck body 1 on a lathe headstock for rotation of the body 1 about an axis 9. This chuck body 1 carries three angularly equispaced jaws 2 each constituted by an outer jaw part 2a projecting beyond the front face 1c and an inner jaw part 2b lying wholly within the chuck body 1. Each of the jaws 2 is slidable in a respective radially extending groove 3, with the outer jaw part 2a having radially extending grooves 10 in which engage radially extending outer guide formations or ridges 11. The inner jaw part 2b rides on guide surfaces 12 in the plate 1a and has a rear surface 13 that rides on the front face of the back plate 1b. The recess 14 formed in the body 1 when the jaw 2 is moved radially outwardly is covered by a shield or skirt 15.

An operating element 4 constituted as a sleeve 5 centered on the axis 9 carries so-called wedge hooks 6 which engage with further wedge hooks 7 on the inner jaw parts 2b. Displacement of the operating element 5 to the left by means of an actuator such as the cylinder shown at 42 in FIG. 1 moves the jaws 2 radially inwardly and opposite displacement, that is toward the right in FIG. 1, displaces them radially outwardly. The piston rod of the actuator 42 may extend through the hollow spindle of the lathe.

The outer and inner parts 2a and 2b of each jaw 2 may be radially coupled together by means of an actuating member 16 formed as a pin with a flattened front end and axially slidable in the inner part 2b. This member 16 has a front end 17 formed with teeth 18 that can mesh with complementary teeth 19 formed on the rear face of the respective outer jaw part 2a. The front face 20 of each rear or inner jaw part 2b is smooth and untoothed so that the two jaw parts 2a and 2b of each jaw 2 can only be rotationally coupled by interengagement of the teeth 18 and 19. FIG. 2 shows how the teeth 18 and 19 extend generally tangentially of the axis A for best radial force transmission between the parts 2a and 2b. In addition the teeth 19 of front or outer jaw part 2a extend the full radial length of this jaw part for positioning of it in any radial position relative to the jaw part 2b.

Figure 4:
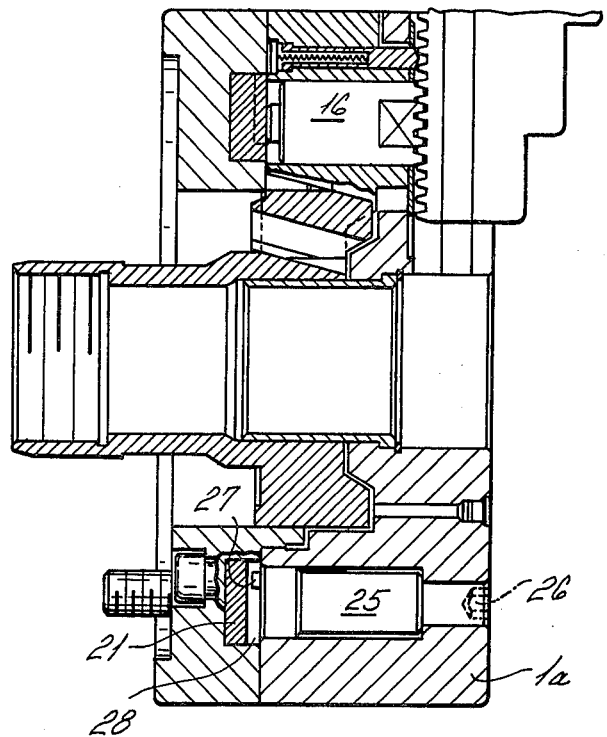
Figure 5:
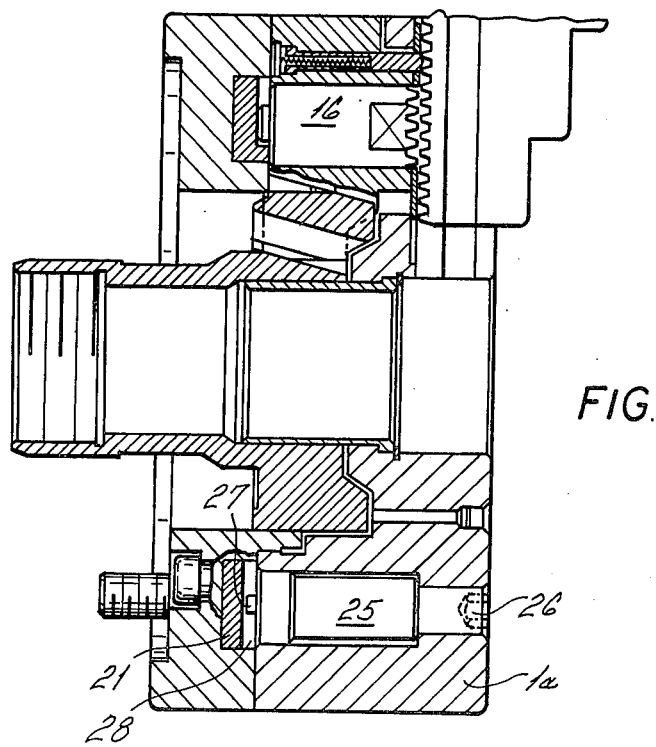
FIG. 5 is a view similar to FIG. 4 but showing the chuck with its coupling member in the decoupling position.

The actuating members 16 are axially displaced between their coupling and decoupling positions shown respectively in FIGS. 4 and 5 by means of a cam ring 21 formed at each of the coupling members 16 with a respective camming recess 22 having an inclined camming surface 24. The cam ring 21 has at the base of each recess 22 a surface 24a and to each side of the recess 22 a surface 24b. Both of these surfaces 24a and 24b lie in respective planes perpendicular to the axis 9. A bump at the rear of each of the inner jaw parts 2b has a rear face 29 that can ride on the surfaces 24a and 24b and over the inclined surface 24. A spring 23 normally urges the guide member 16 backwardly toward the ring 21 so that the surface 29 rides on the ring 21 at one of the surfaces 24a, 24b, or 24.

The ring 21 is angularly displaceable between a pair of angularly offset positions in one of which the surface 29 bears on the surface 24a and in the other of which the surface 29 bears on the surface 24b by means of a setting pin 25. At the face 1c the setting pin 25 has an axially exposed head formed with an Allen recess 26 and at its opposite axial end this pin 25 has an eccentric pin 27 engaged within a radially extending groove 28 formed in the ring 21.

In addition each rear or inner jaw part 2b is formed with an axially extending bore in which is slidable a pin 40 that has a blunt but slightly pointed end engageable with the teeth 19 and which is biased by means of a spring 41 into engagement with these teeth 19. The pin 40 is spaced radially from the coupling member 16 by a distance calculated so that the teeth 19 will always be meshable with the teeth 18 whenever the pin 40 is engaged between two of the teeth 19. This pin 40 therefore ensures that the teeth 19 and 18 are normally perfectly aligned, and further prevents the outer jaw parts 2a from falling loosely out of the chuck body 1 when the coupling members 16 are in the retracted position of FIG. 5, without however in any way preventing their being pulled out with concomitant compression of the spring 41.

Thus in order to remove the outer jaw parts 2a the user of the chuck need merely place an Allen wrench in the recess 26 and rotate the setting pin 25 through 90° between the position of FIG. 4 and the position of FIG. 5. This action will angularly displace the ring 21 so that the surfaces 29 will ride from the cam surfaces 24b down over the inclined surfaces 24 to the surfaces 24a and the springs 23 will therefore pull the coupling members 16 axially backwardly to disengage the teeth 18 and 19. The user can then pull the outer parts 2a radially out of the body 1 or reposition them. During such operation there is no need to change the position of the operating element 4. Furthermore if one of the outer jaw parts 2a is, for example, damaged, the user need merely withdraw that jaw part, as the pins 40 will hold the other outer jaw parts 2a in place.

Figure 6:
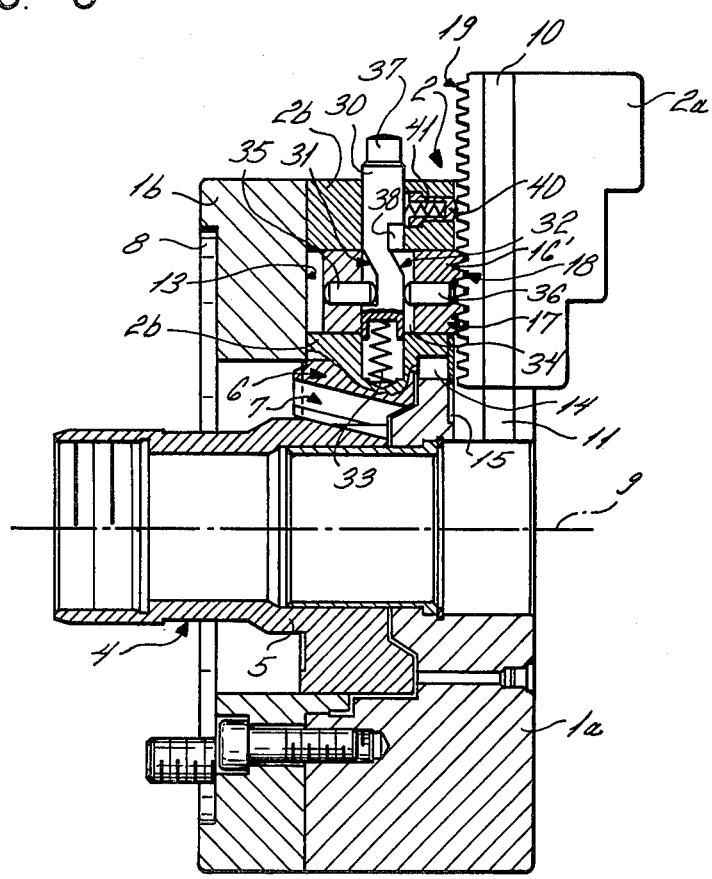
FIG. 6 is a view similar to FIG. 1 showing another chuck in accordance with this invention.

FIG. 6 shows an arrangement similar to that of FIGS. 1-5 and using identical reference numerals for functionally identical structure. Here, however, each coupling member 16' is formed with a radially throughgoing hole 34 through which extends an actuating member or pin 30 having an inclined rear guide surface 31 and an inclined front guide surface 32. To each side of this member 30 each of the coupling members 16' has an actuation formation formed by a pin 35 and a pin 36. A spring 33 biases the actuation member 30 radially outwardly in the respective inner jaw part 2b.

When in the illustrated radially outward position the member 30 holds the actuation member 16' in the coupling position with its teeth 18 meshed with the teeth 19 of the outer jaw part 2a. When depressed radially inwardly, however, the surfaces 31 and 32 act on the actuation formations 35 and 36 and displace the member 16' axially backwardly to pull the teeth 18 and 19 axially out of engagement with each other. When fully depressed the formation 36 is received in a recess 38 of the member 30 so that the member 16' is held in this retracted position.

With the system of FIG. 6 the user need merely depress the button-like upper end 37 of the member 30 to free the respective outer jaw part 2a. When the member 30 is released the spring 33 will automatically return it to the radial outer position to remesh the teeth 18 and 19. During use when the chuck is rotated at relatively high speed centrifugal force will also act to urge the member 30 radially outwardly and thereby ensure excellent locking-together of all of the parts 2a with the respective parts 2b.

I claim:

1. A chuck comprising:
a chuck body rotatable about an axis and formed with a plurality of angularly spaced radially extending inner guides and a plurality of angularly spaced radially extending outer guides;
a respective inner jaw part radially displaceable in said chuck body in each of said inner guides;
means including at least one operating element engageable with said inner jaw parts for radially displacing same in said chuck body in the respective inner guides;
a respective outer jaw part projecting axially from said chuck body and radially displaceable therein in each of said outer guides;

a respective coupling member between each of said inner jaw parts and the respective outer jaw part and displaceable between a coupling position engaging both of the respective parts and coupling same together for joint radial displacement and a decoupling position for relative radial displacement of same; and means including a respective cam engaging each of said coupling members for displacing said members between said coupling and decoupling positions independently of one another, each of said cams being generally radially displaceable of said axis between a radial inner position corresponding to said decoupling position and a radial outer position corresponding to said coupling position, whereby centrifugal forces acting on said cams will urge said members into said coupling positions.

2. The chuck defined in claim 1 wherein each of said coupling members is axially displaceable in the respective inner jaw part between said positions, but is jointly radially displaceable with the respective inner jaw part.

3. The chuck defined in claim 2 wherein said coupling members each have a front face turned toward the respective outer jaw part and each outer jaw part has a back face turned toward the front face of the respective coupling member, said faces being formed with axially interengageable coupling formations.

4. The chuck defined in claim 3 wherein said formations are axially extending intermeshing teeth on said faces.

5. The chuck defined in claim 1 wherein each of said cams has an axially backwardly directed cam surface and an axially forwardly directed cam surface spaced apart by a predetermined axial distance, said coupling members each having an axially forwardly directed actuation surface engaging the respective backwardly directed cam surface and an axially backwardly directed actuation surface engaging the respective forwardly directed cam surface and spaced axially from the respective forwardly directed actuation surface substantially by said distance.

6. The chuck defined in claim 3 wherein said inner guides are axially spaced and separate from the respective outer guides.

7. The chuck defined in claim 6 wherein said guides are angularly equispaced about said axis and each inner guide is directly axially offset from the respective outer guide.

8. The chuck defined in claim 3 wherein said chuck body has an axially directed outer face, said outer jaw parts projecting from said face and said inner jaw parts lying wholly inside said body behind said face.

9. The chuck defined in claim 3 wherein said operating element has an axially tapered operating surface engageable with said inner jaw parts.

10. The chuck defined in claim 3 wherein said coupling members are each formed with teeth directed toward the respective outer jaw part which similarly is provided with teeth meshable with said teeth of the respective coupling member, said chuck further comprising means effective in said decoupling position of any of said coupling members for holding the respective outer jaw part in a position with its said teeth aligned and meshable with the teeth of the respective coupling member.

11. A chuck comprising:
a chuck body rotatable about an axis and formed with a plurality of angularly spaced radially extending inner guides and a plurality of angularly spaced radially extending outer guides;
a respective inner jaw part radially displaceable in said chuck body in each of said inner guides;
means including at least one operating element engageable with said inner jaw parts for radially displacing same in said chuck body in the respective inner guides;
a respective outer jaw part projecting axially from said chuck body and radially displaceable therein in each of said outer guides;
a respective coupling member between each of said inner jaw parts and the respective outer jaw part and displaceable between a coupling position engaging both of the respective parts and coupling same together for joint radial displacement and a decoupling position for relative radial displacement of same; and
means including a respective cam engaging each of said coupling members for displacing said members between said coupling and decoupling positions independently of one another, each of said cams having an axially backwardly directed cam surface and an axially forwardly directed cam surface spaced apart by a predetermined axial distance, said coupling members each having an axially forwardly directed actuation surface engaging the respective backwardly directed cam surface and an axially backwardly directed actuation surface engaging the respective forwardly directed cam surface and spaced axially from the respective forwardly directed actuation surface substantially by said distance.

12. The chuck defined in claim 11, wherein each of said coupling members is axially displaceable in the respective inner jaw part between said positions, but is jointly radially displaceable with the respective inner jaw part.

13. The chuck defined in claim 12, wherein said coupling members each have a front face turned toward the respective outer jaw part and each outer jaw part has a back face turned toward the front face of the respective coupling member, said faces being formed with axially interengageable coupling formations.

14. The chuck defined in claim 13 wherein said formations are axially extending intermeshing teeth on said faces.

15. The chuck defined in claim 11 wherein each of said cams is generally radially displaceable of said axis between a radial inner position corresponding to said decoupling position and a radial outer position corresponding to said coupling position, whereby centrifugal forces acting on said cams will urge said members into said coupling position.

* * * * *